(12) United States Patent
Malipeddu et al.

(10) Patent No.: US 12,153,594 B2
(45) Date of Patent: Nov. 26, 2024

(54) SMART VIEW GENERATION FOR PAYLOADS

(71) Applicant: SAP SE, Walldorf (DE)

(72) Inventors: Ravikanth Malipeddu, Bangalore (IN); Aparna Vohra, Bangalore (IN)

(73) Assignee: SAP SE, Walldorf (DE)

( * ) Notice: Subject to any disclaimer, the term of this patent is extended or adjusted under 35 U.S.C. 154(b) by 138 days.

(21) Appl. No.: 17/568,211

(22) Filed: Jan. 4, 2022

(65) Prior Publication Data

US 2023/0214401 A1     Jul. 6, 2023

(51) Int. Cl.
*G06F 16/248* (2019.01)
*G06F 16/22* (2019.01)
*G06F 3/0484* (2022.01)

(52) U.S. Cl.
CPC ........ *G06F 16/248* (2019.01); *G06F 16/2246* (2019.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 6,018,741 | A * | 1/2000 | Howland | G06F 16/9027 707/696 |
| 11,100,454 | B1 * | 8/2021 | Uderani | H04L 41/5041 |
| 2018/0324132 | A1 * | 11/2018 | Barnard | G06F 9/542 |
| 2018/0359342 | A1 * | 12/2018 | Rollet | H04L 69/16 |
| 2019/0188288 | A1 * | 6/2019 | Holm | G06F 16/289 |
| 2020/0097266 | A1 * | 3/2020 | Lodhia | G06F 8/34 |

OTHER PUBLICATIONS

Juan, "Test case generation method, device, equipment and storage medium", 2019; (Year: 2019).*

* cited by examiner

*Primary Examiner* — Dawaune A Conyers (74) *Attorney, Agent, or Firm* — Buckley, Maschoff & Talwalkar LLC (57) ABSTRACT

According to some embodiments, systems and methods are provided, comprising a payload source; a memory storing processor-executable program code; and a processing unit to execute the processor-executable program code to cause the system to: receive a payload structure from the payload source; traverse the payload structure; identify one or more key-value pairs via the traversal; identify, for each identified key-value pair, a first attribute for each key; create a node for each key-value pair based on the identified first attribute and a value of the key-value pair; generate a data-entry field in a user interface for each created node; and render the user interface, wherein the rendered user interface includes a label for each created node, and the label is linked to a respective data-entry field. Numerous other aspects are provided.

18 Claims, 9 Drawing Sheets

```
302 ─┐   330 ─┐    ┌─ 306
     {       ┌─ 310     ┌─ 304
     "SalesOrder": {
308 ─── "type": "property",
        "dataType": "string",
312 ─── "label": "Sales Order",
        "value": "",
        "maxLength": 10,
        "validate": true,
        "mandatory": false,
        "technicalName": "SalesOrder"
     },
     "SalesOrderType": {
        "type": "property",
        "dataType": "string",
        "label": "Sales Order Type",
        "value": "",
        "maxLength": 4,
        "validate": true,
        "mandatory": true,
        "technicalName": "SalesOrderType"
     },
        ⋮
340 ── "to_Item": {
        "results": [
          {
            "SalesOrderItem": {
               "type": "property",
               "dataType": "string",
               "label": "Item",
               "value": "",
               "maxLength": 6,
               "validate": true,
               "mandatory": false,
               "technicalName": "SalesOrderItem"
            },
            "HigherLevelItem": {
               "type": "property",
               "mandatory": false,
               "technicalName": "HigherLevelItem"
            },
            "SalesOrderItemCategory": {
               "type": "property",
               "dataType": "string",
               "label": "Item Category",
               "value": "",
               "maxLength": 4,
               "validate": true,
               "mandatory": false,
               "technicalName": "SalesOrderItemCategory"
            },
              ⋮
```

FIG. 3

Create API Step

① Basic Information —— ② Connection to Service —— ③ Entity Operation —— ④ Mandatory Parameter or Payload

4. Mandatory Parameters or Payload

Code View: ◯OFF — 404
Payload in Smart View:

| | Parameter | Value |
|---|---|---|
| | ˅ Entity Header | |
| ☐ | Sales Order Without Charge | |
| ☐ | Sales Document Type* | OR |
| ☐ | Sales Organization* | 1010 |
| ☐ | Distribution Channel* | 10 |
| ☐ | Division* | 00 |
| ☐ | Sales Group | |
| ☐ | Sales Office | |
| ☐ | Sales District | |
| ☐ | Sold-to Party* | 10100001 |
| ☐ | Customer Reference | |
| ☐ | Purchase Order Type | |
| ☐ | Customer Ref. Date | *Enter value in dd/MM/yyyy* |
| ☐ | Document Date | |
| ☐ | Document Currency | *Enter value in dd/MM/yyyy* |
| ☐ | Order Reason | |

[Previous] [Generate Test] [Cancel]

SMART VIEW GENERATION FOR PAYLOADS

BACKGROUND

Enterprises periodically receive new applications and/or new features for existing applications. In the past, these applications/features were delivered once a year or once every two years. More recently, the applications/releases occur more frequently (e.g., every 3 months, or monthly, or even weekly). During development and/or delivery of these application/features, the applications/features may be tested for accurately performing as expected. Conventional manual testing, where a user interacts with an application by navigating from screen to screen, clicking buttons and testing fields, may be costly in terms of time and error generation, and with more frequent testing, manual testing becomes more costly. As an alternative to conventional manual testing, testing may be automated. The automated testing may include at least one of an entirely automated user interface flow that mimics the manual testing or may include Application Programming Interface (API) test automation. API testing ("test automation") is a type of application/software testing where APIs are tested to determine if they meet expectations for functionality, reliability, performance and security. With automated API testing, a testing tool (e.g., SoapUI) is used to test the API. Automated API testing, however, may include challenges associated with a payload of the API, as well as data format.

Systems and methods are desired which support payload generation for automated API testing.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

An Application Programming Interface (API) is a software intermediary that, via a set of functions and procedures, allows two applications to communicate with each other. More particularly, the API acts as a messenger which takes a request from a requesting application to access the features or data of a target operating system, application or other service, delivers the request to the target, and returns a response to the requesting application. Non-exhaustive examples of HTTP-based APIs are Open Data Protocol (OData) and Simple Object Access Protocol (SOAP). OData is a data access protocol used to query and update data and to trigger business logic. OData is designed to provide standard Create Read Update and Delete (CRUD) access via HTTP(S) and provides for synchronous request with a response. SOAP is a protocol for exchanging information in distributed environments and is the preferred protocol for asynchronous messaging (e.g., error handling). With more platforms and technologies (e.g., applications) being used within enterprises, the APIs, which are technology independent and without a user interface, may facilitate the use of these platforms and technologies.

As described above, when a new feature/application is received by an enterprise, before the enterprise uses the new feature/application, the API to be used with new feature/application may be tested to determine if it meets expectations for functionality, reliability, performance, and security. API testing makes use of a payload. A payload is the part of the transmitted data or message of the data packet that is the actual intended message (e.g., minus headers attached for transport and minus descriptive meta-data) submitted by the API, for example, to a target server when a request is made. The payload may be sent and received in formats including, but not limited to, XML and JSON.

With respect to the payload and testing thereof, the test API payload may include a large set of fields which are available as part of the API, which may make the construction of a test API payload difficult for a non-developer/non-technical user. For example, before the request is sent to the target system, the fields may be filled in with values, and these values yield a particular output for this call/request.

When the output is as expected, the API has passed the test. However, understanding a payload and its format to create a test API payload often requires expertise (e.g., a developer/tech person, who understands the payload for that application/feature), as the API payload may be hundreds to thousands of lines of code and may have hundreds of fields in a particular structure that need to be maintained to ensure that a correct response is received. Additionally, with respect to the format of the data in the payload, the dates and timestamp values may not be in a format that a user understands, and may need to be converted from the actual format to formats such as millisecond for user-understanding and then back again for transmission to the target system. In some instances, initial configuration and settings may need to be passed in a payload depending on the application under test, and this may not be understood by a non-developer/tech person. This nature of the API payload may result in a high probability of erroneous information being passed through it, resulting in errors that may be costly to resolve. Another challenge with generating a test API payload may be the modification of existing payloads so they are adapted for multiple test variants (e.g., handling/generating multiple data sets to test consistency of API with different payloads), particularly in complex payloads.

One or more embodiments provide a payload generation module to build a user interface to create a payload for API testing. Embodiments simplify the testing of the flow of information between systems via APIs by creating the payload structure (and subsequent payload) via an automated payload generation module. The payload generation module may create a user interface that presents an API payload structure, which may receive values to complete the payload for testing the API, in a way that a non-developer/non-tech person may easily understand. Some embodiments may enable a user to create similar complex payloads with no coding and without any need for technical experience with respect to the payload body. In embodiments, the payload generation module may generate a tree structure as a representation of the payload structure, which may enable a user to interpret the payload by using labels/semantics of data-entry fields to be filled via a user interface. Embodiments may help users prepare payloads by entering data into fields to simulate the response of an API, thus enabling the user to generate a required payload by having a functional understanding of the application/feature being tested, and without technical knowledge of the payload body. By using the user-entry fields and automating the conversion of data and time formats in the payload structure, embodiments also may result in a reduction of errors creating the payload. The payload generation module may be applicable to any type of API.

Figure 1:
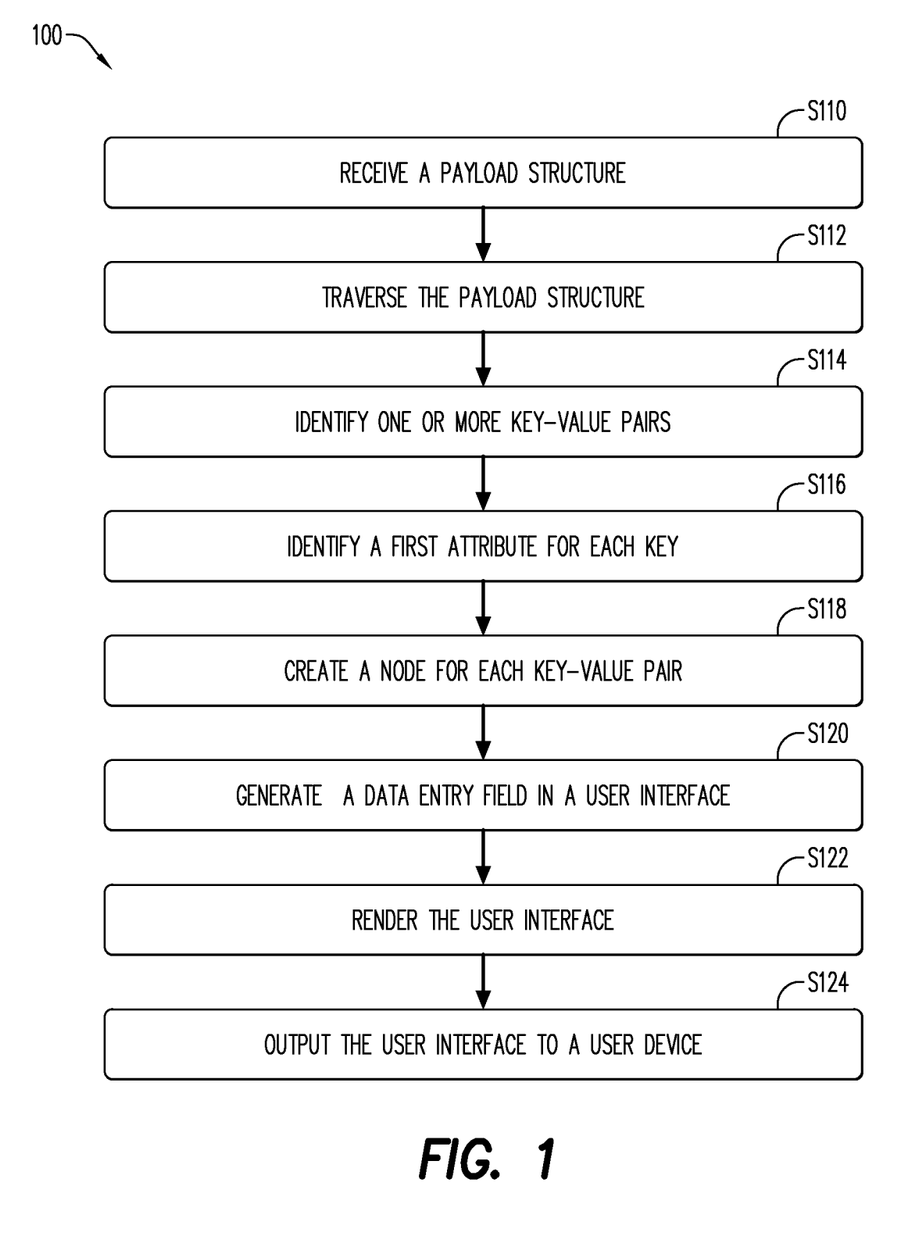
FIG. 1 is a flow diagram of a process according to some embodiments.
Figure 8:
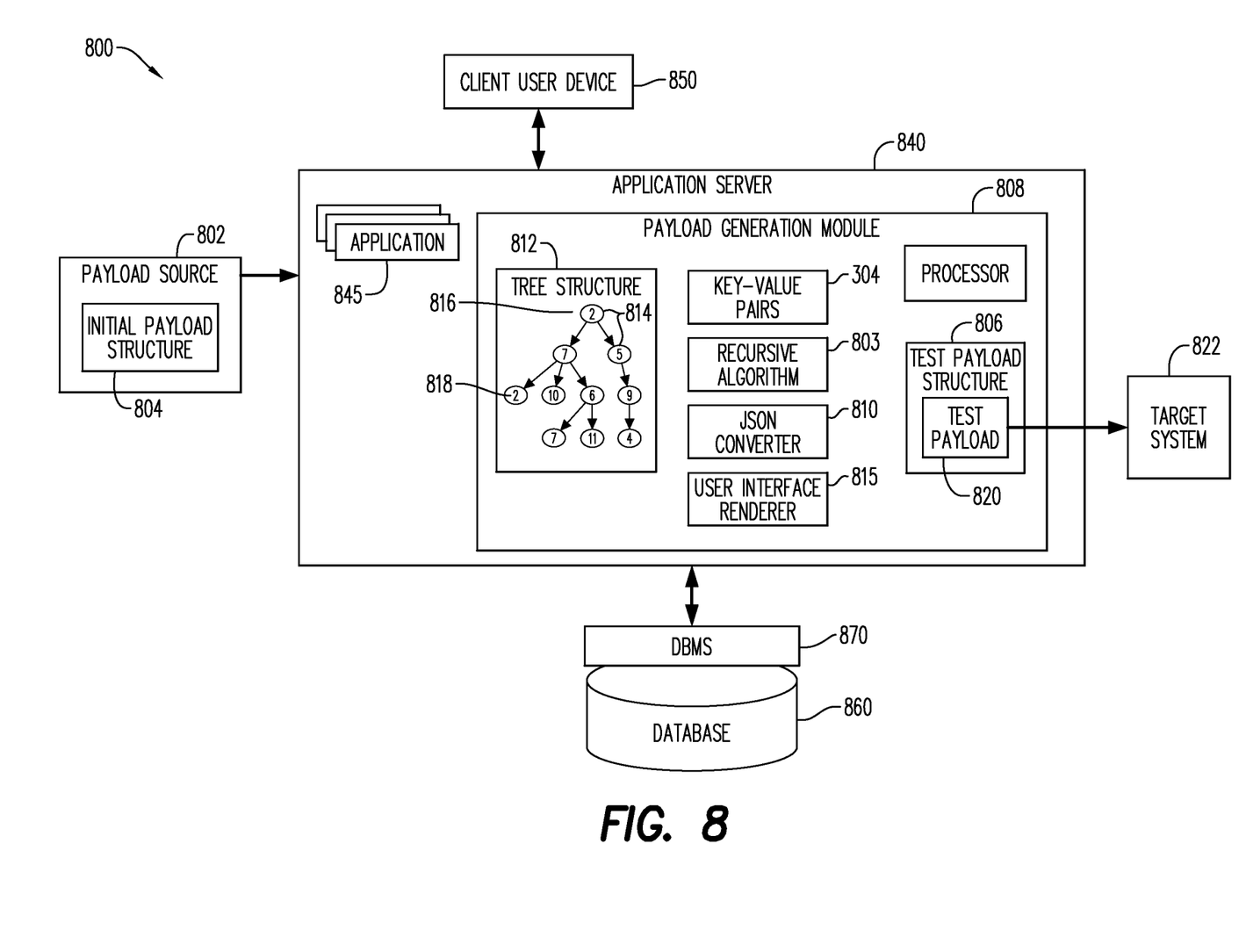
FIG. 8 illustrates a system according to some embodiments.

FIG. 1 describes a process 100 for generating a test payload structure 806 (FIG. 8). Process 100 may be executed by application server 840 (FIG. 8) according to some embodiments. In one or more embodiments, the application server 840 (FIG. 8) may be conditioned to perform the process 100, such that a processor 910 (FIG. 9) of the application server 840 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the start of the process 100, a user may select an API for automation testing (e.g., for generating a payload to test).

Figure 2:
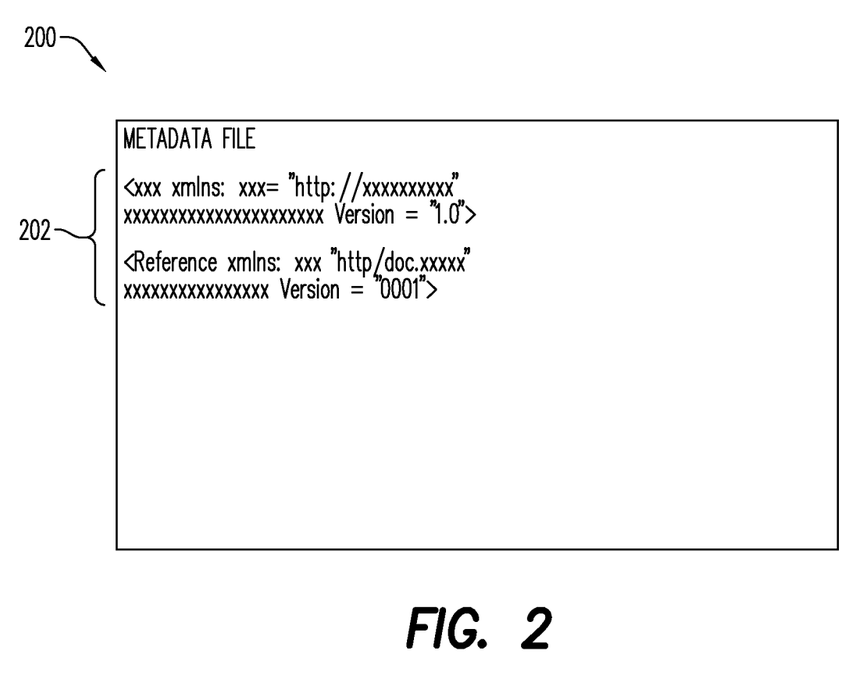
FIG. 2 is a non-exhaustive example of metadata according to some embodiments.

Initially, at S110, an initial payload structure 804 is received from a payload source 802. The payload source 802 may be a public or private repository of payload structures 804. Conventionally, this payload structure may include the different fields for the given payload but may not include any values for the different fields. Conventionally, the user may copy and paste the payload structure into an automated API testing tool (e.g., POSTMAN®), and then enter values for the fields. However, with the complex code view provided by this tool, it may be hard to understand which fields are actually fields, and of those fields, it may be hard to understand which fields are mandatory and require data, and the correct data to enter in the fields. In some embodiments, the initial payload structure 804 may be received from the payload source 802 as metadata 202 (FIG. 2) in a metadata file 200 in an HTML format or in a JSON format. The metadata 202 may include the technical information for every field in the initial payload structure 804. In a case the initial payload structure 804 is received as metadata 202 in an HTML, format, a payload generation module 808 may convert the initial payload structure 804 to a JSON format 302 (FIG. 3) using any suitable JSON converter 810.

Figure 3:
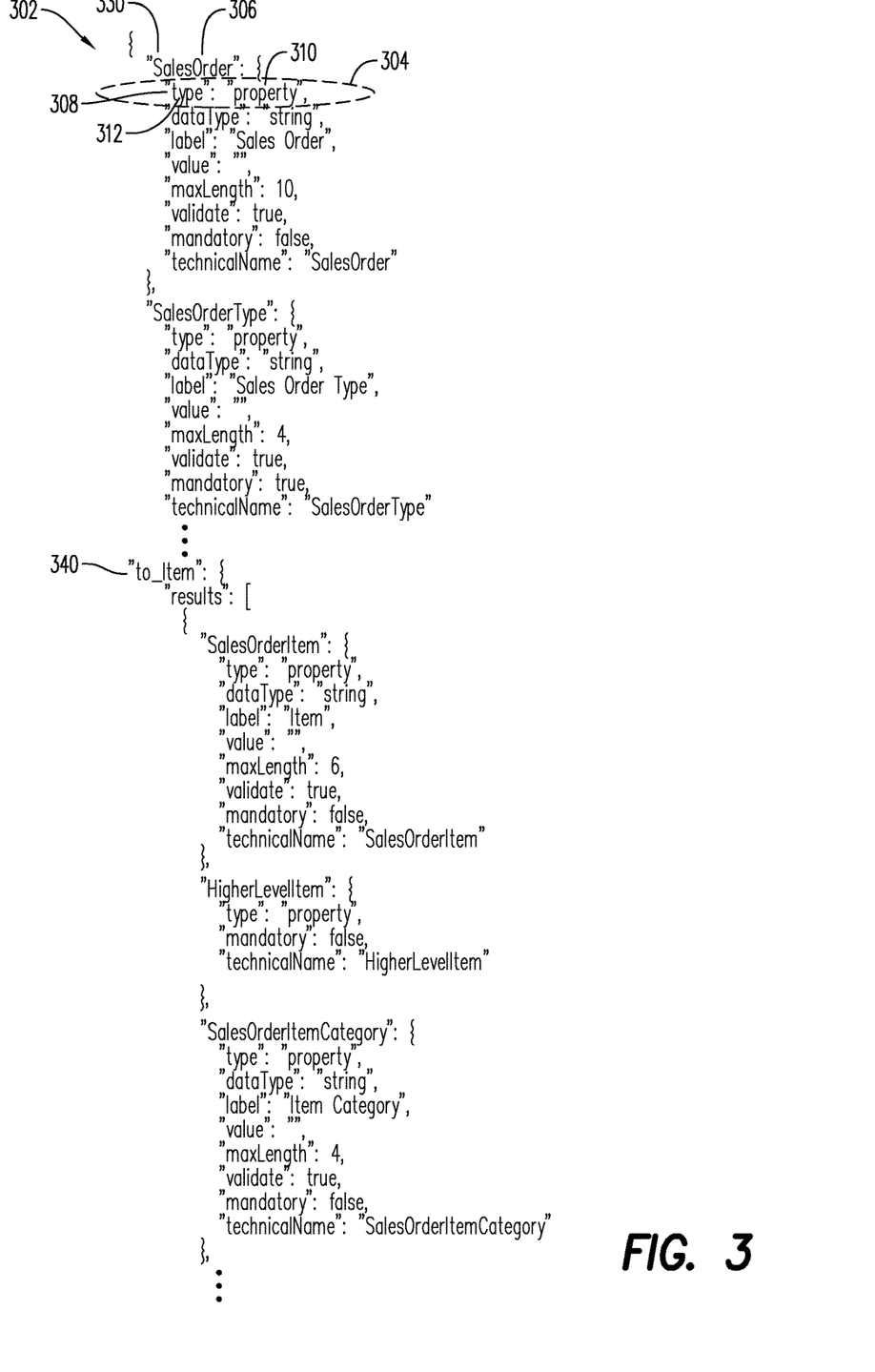
FIG. 3 is a non-exhaustive example of a JSON file according to some embodiments.

Then at S112, the initial payload structure 804 is traversed by a recursive algorithm 803 of the payload generation module 808. In some embodiments, the traversal may occur line-by-line of the JSON format 302 of the initial payload structure 804 and may traverse the complete JSON format 302 of the initial payload structure 804.

During the traversal, the recursive algorithm 803 may identify one or more key-value pairs 304 (FIG. 3) at S114. The JSON format 302 may include a description of an object 306 (e.g., "SalesOrder" in FIG. 3) surrounded by curly braces { }, where everything inside the curly braces is part of the object 306. Each JSON object 306 may contain a key-value pair 304. The key-value pairs 304 may also be referred to as properties. In some embodiments, the key-value pairs 304 may be identified on a per-object basis. In embodiments, the recursive algorithm 803 may identify the one or more key-value pairs 304 by several properties of the key-value pairs 304, including, but not limited to, the key 308 is separated from the value 310 by a colon, the key 308 may be a string enclosed in quotation marks, and the value 310 may be a string, number, Boolean expression, array or object. Another property used for identification of the key-value pair 304 may be that each key-value pair 304 may be separated by a comma, such that a first pair is separated from a second pair by the comma.

Then, in S116, for each identified key-value pair 304 for a given object 306, the payload generation module 808 may identify a first attribute 312 for each key 308. A node 814 in a tree structure 812 may be created for each identified key-value pair 304 at S118 based on the identified first attribute and a value of the key-value pair. The first node created for the tree structure may be referred to as the "root node". A tree structure 812 may be created for each test payload structure 806. As the nodes are created, they may be added to the tree structure. The type (parent or child) of nodes for a given object 306 may be based on the identification of the first attribute and value, as described further below with respect to FIG. 5. In some embodiments, properties of the created node may be set as per the JSON key 308 (having all metadata information).

Figure 4:
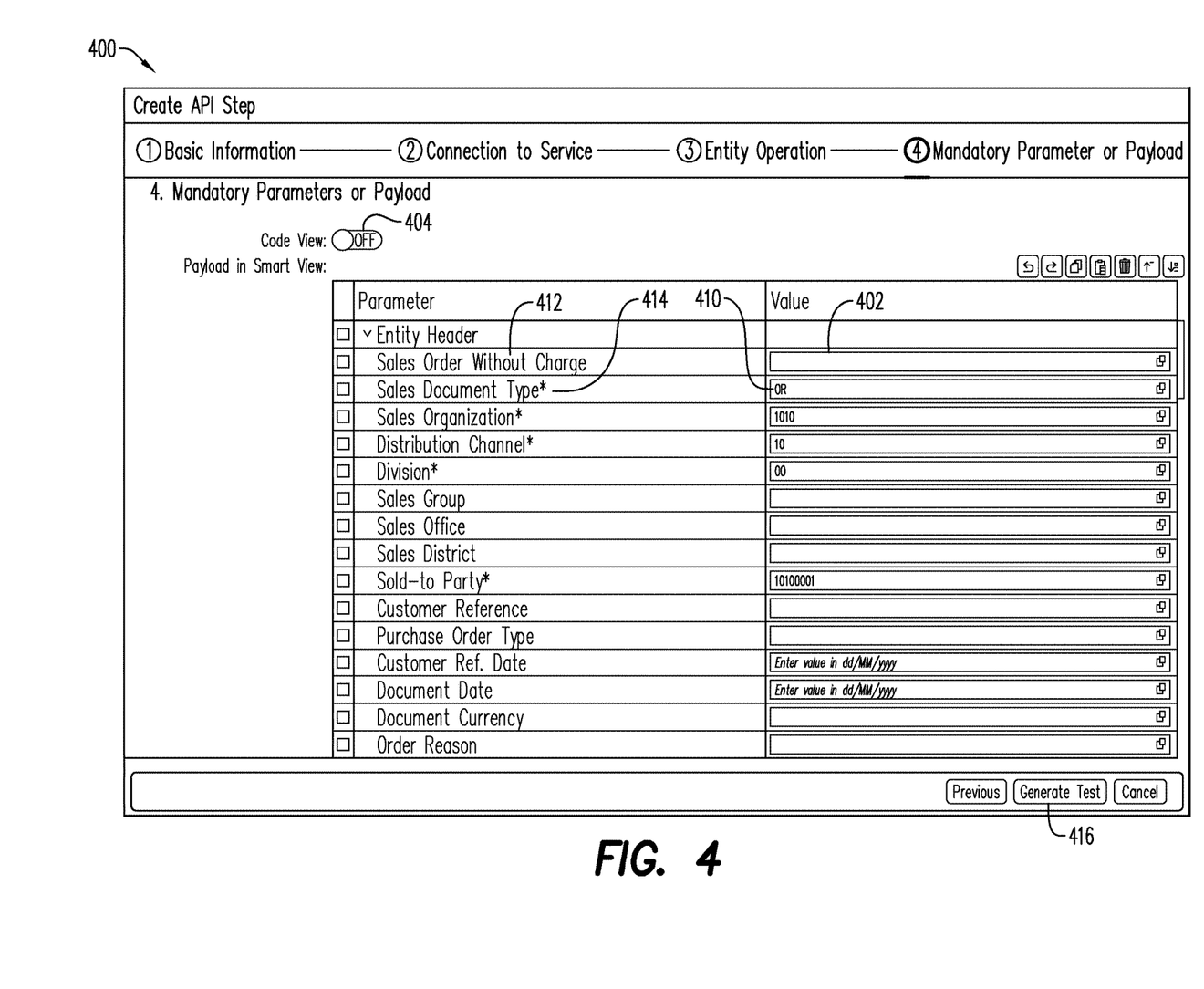
FIG. 4 illustrates a rendered non-exhaustive example of a user interface including a payload according to some embodiments.

Next, in S120, a data-entry field 402 may be generated in a user interface 400 for each created node 814/object 306. The placement of the data-entry field 402 may be based on the type of node and the node's hierarchical placement in the tree structure 812. The user interface 400 may be rendered in S122 by any suitable user interface renderer 815 and output to a user device 850 at S124.

Figure 5:
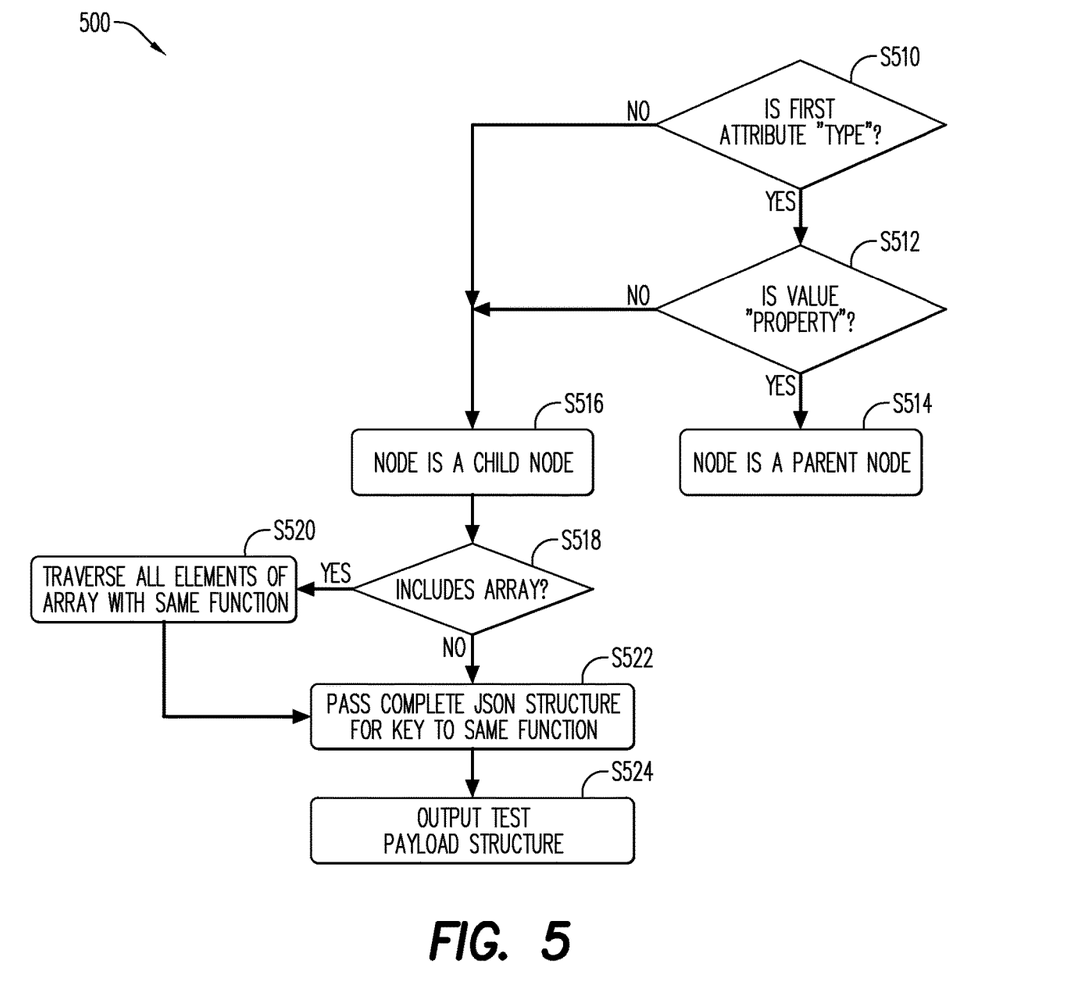
FIG. 5 illustrates a flow diagram of a process according to some embodiments.

Turning to FIG. 5 a process 500 for determining the type of node (parent or child) is provided.

Following the identification of the first attribute at S116, the payload generation module 808 may, for the given object 306, identify the first attribute 312 as "type" or as another attribute (e.g., not "type") at S510. In a case the payload generation module 808 identifies the first attribute 312 as "type," the payload generation module 808 may identify a value 310 of the key-value pair 304 as "property" or another attribute (e.g., not "property") at S512. In a case the payload generation module 808 identifies the value as "property", the payload generation module 808 may determine at S514 the node 814 is a parent node 816 for that key-value pair 304 for that object 306. The parent node for that object 306 may be created for the tree structure 812 and added as a parent node for the object 306. As a non-exhaustive example, for the object "SalesOrder" 330 in FIG. 3, the first attribute is "type" with a value of "property". This object has a data type "string", which has a label called "sales order" and a maximum length of "10". As can be seen, this node does not include any nested nodes within.

In a case the payload generation module 808 identifies the first attribute 312 as not "type," in S510, the process proceeds to S516 and the node 814 is a child node 818 for that key-value pair 304 for the given object 306. Similarly, in a case the payload generation module 808 identifies the value 310 of the key-value pair 304 as not "property in S512, the process 500 proceeds to S516 and the node 814 is a child node 818 for that key-value pair 304 for the given object. In embodiments, in a case the child node is created, the parent node 816 may include an array that may be used for storing the node's children, thereby creating a nested structure.

As a non-exhaustive example for the "to_Item" object 340 in FIG. 3, the first attribute is not "type"—rather, it is "results", so this is a child node, having further nested child nodes of "SalesOrderItem", "HigherLevelItem" and "SalesOrderItemCategory".

In one or more embodiments, in a case the node is determined to be a child node 818 at S516, the process 500 may proceed to S518, and it is determined whether the child node includes an array. In a case the child node 818 includes an array, the recursive algorithm 803 may use a loop to traverse all elements of the array at S520, passing each array element to the same function of the child node, until all of the elements of the array are traversed. After all of the elements of the array are traversed, and in a case the child node does not include an array at S518, the complete payload structure 806 for the object 306/key 308 is passed to the function of the parent node at S522. After the complete payload structure 804 is traversed in a manner described above for each object 306/key 308, a test payload structure 806 is output at S524. The test payload structure 806 may be a structure having nested arrays that may be bound to tree table control on a user interface 400, thereby creating a hierarchical tree structure having parent-child relationships.

In the form of the user interface, the test payload structure 806 may include the data-entry fields 402 generated at S120.

Figure 6:
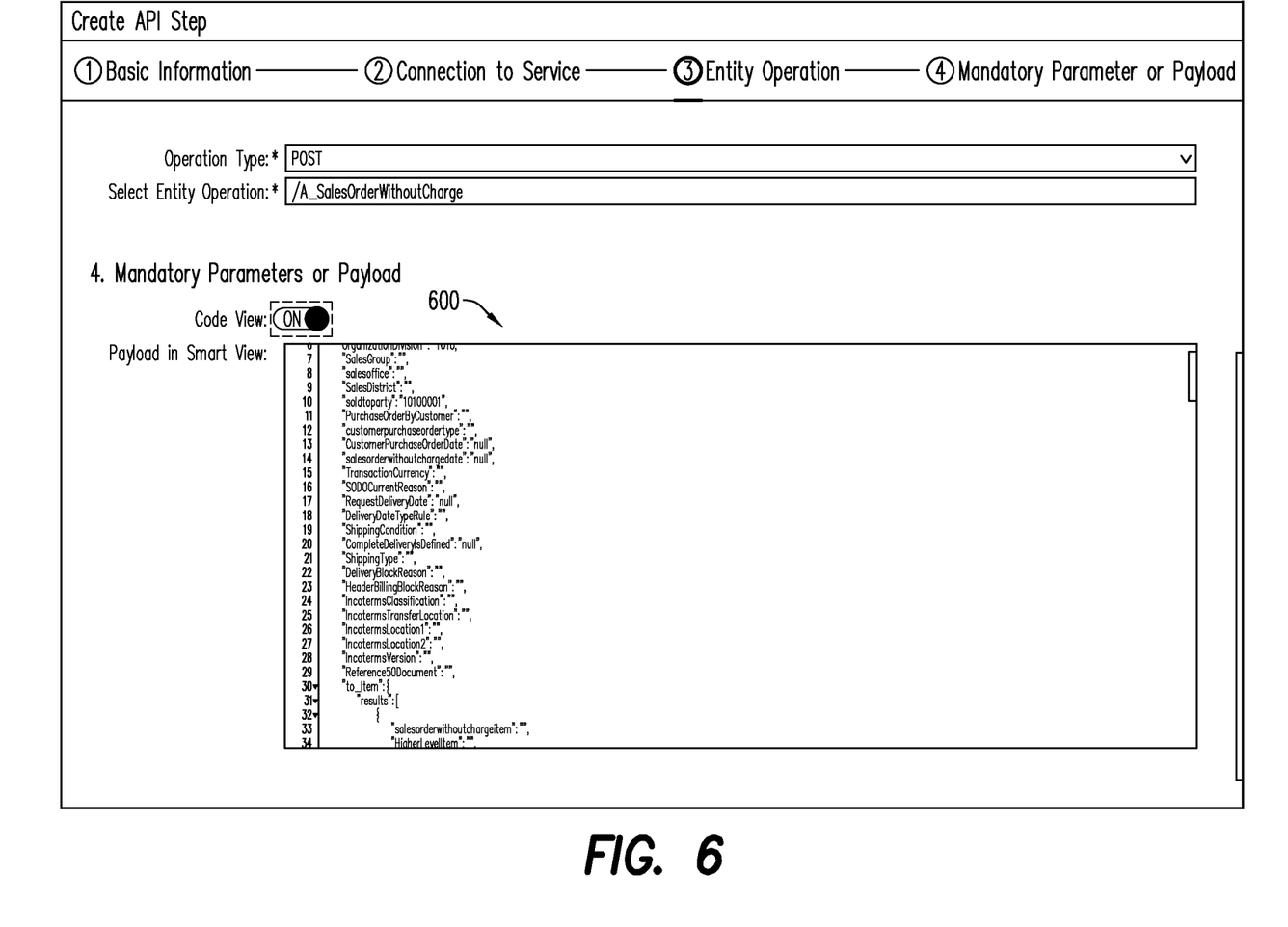
FIG. 6 illustrates a rendered non-exhaustive example of a technical view of a payload according to some embodiments.

In one or more embodiments, the user interface 400 may include a toggle button 404, or another selector that may allow a user to view the test payload structure 806 as the data-entry field view, as shown in FIG. 4, or as a code-view 600, as shown in FIG. 6.

Figure 7:
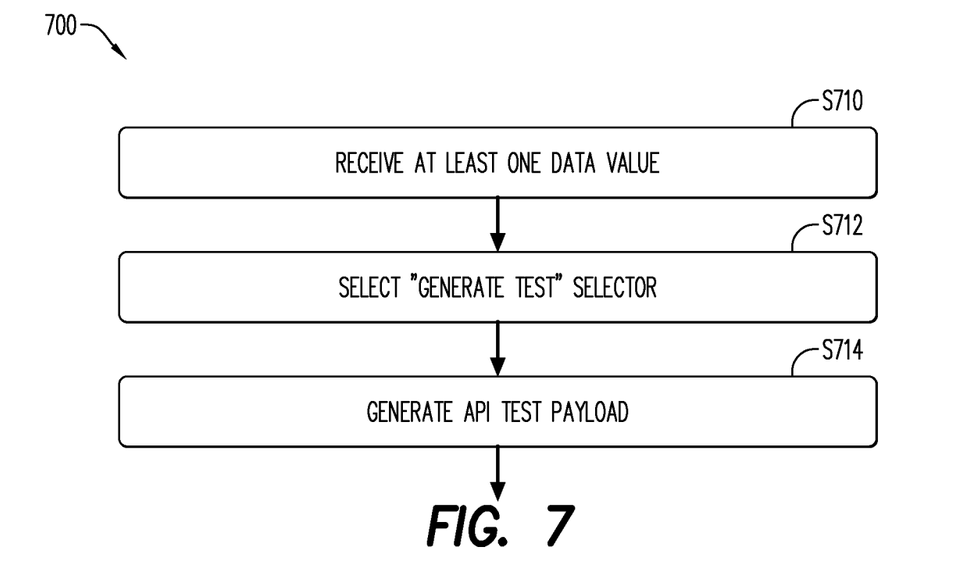
FIG. 7 illustrates a flow diagram of a process according to some embodiments.

Turning to FIG. 7, a process 700 for generating the test payload is provided.

After the user interface 400 is output to the user device in S124, a data value 410 may be received at S710 in at least one data-entry field 402. The data value 410 may be received via free-form text, drop-down menu, radio button, or any other suitable data-entry methods. The user interface 400 may include a label 412 identifying each node/object. In some embodiments, the label may include a mandatory parameter indicator 414 (e.g., an asterisk) in a case the node is required for execution of the test payload.

In one or more embodiments, a child node may be indicated as a child node by a drop-down arrow proximate the label or via other suitable indicator.

In embodiments, a user may extend a node on the user interface 400 prior to selecting the "Generate Test" selector 416.

The node may be extended to test additional values for the node. For example, with a sales order, a user may want to test a line item with one item and a line item with ten items. Conventionally, a user would need to cut and paste the payload structure for this particular item ten times to create ten items. However, if not copied correctly (e.g., missed a bracket, or comma, included an extra line of code, etc.), an error would result. One or more embodiments provide a simple way of extending the node by copying and pasting an entire node and replicating it "n" number of times. To extend the node, the user selects the data-entry field for the node that will be extended. The user then executes a Copy command, which is received by the payload generation module 808. The payload generation module 808 copies the payload structure for the copied data-entry field/node to be extended ("extendable node"). Next, the user selects the node/object as a location to paste the payload structure for the extendable node and executes a Paste command, which is received by the payload generation module 808. Receipt of the selection of the node by the payload generation module 808 may mark the node as extendable. Receipt of the Paste command may cause the payload generation module 808 to automatically generate an additional data-entry field linked to the extendable node (thereby extending the extendable node), whereby an additional data-entry field is available under the same label. It is noted that extending the node in this manner avoids the user having to understand the payload to determine where to place the additional values and avoids mistakenly inserting the additional values in an incorrect place.

After the data values 410 are received at least in the data-entry fields 402 for the mandatory nodes, the user may select a "Generate Test" selector 416 at S712 to generate the API test payload 820 at S714. The test payload 820 may include all of the values received by the user interface 400. The test payload 820 may then be transmitted to the target system 822 as part of the test. As described above, in a case the target system returns expected values in response to receipt of the test payload, the API operates as expected.

FIG. 8 is a block diagram of system architecture 800 according to some embodiments. Embodiments are not limited to architecture 800 or to a three-tier storage architecture.

Architecture 800 includes a payload generation module 808, a database 860, a database management system (DBMS) 870, an application server 840, application(s) 845, and clients 850. Applications 845 may comprise server-side executable program code (e.g., compiled code, scripts, etc.) executing within application server 840 to receive queries/requests from clients 850 and provide results (API payload) to clients 850/target systems 822 based on data of database 860 and the output of the payload generation module 808. A client 850 may access the payload generation module 808 executing within application server 840, to generate the user interfaces 400, as described above.

Application server 840 provides any suitable interfaces through which the clients 850 may communicate with the payload generation module 808 or applications 845 executing on application server 840. For example, application server 840 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 845 executing on server 840 may communicate with DBMS 870 using database management interfaces such as, but not limited to, Open Database Connectivity (ODBC) and Java Database Connectivity (JDBC) interfaces. These types of applications 845 may use Structured Query Language (SQL) to manage and query data stored in database 860.

DBMS 870 serves requests to retrieve and/or modify data of database 860, and also performs administrative and management functions. Such functions may include snapshot and backup management, indexing, optimization, garbage collection, and/or any other database functions that are or become known. DBMS 870 may also provide application logic, such as database procedures and/or calculations, according to some embodiments. This application logic may comprise scripts, functional libraries and/or compiled program code. DBMS 870 may comprise any query-responsive database system that is or becomes known, including but not limited to a structured-query language (i.e., SQL) relational database management system.

Application server 850 may be separated from, or closely integrated with, DBMS 870. A closely integrated application server 850 may enable execution of server applications 845 completely on the database platform, without the need for an additional application server. For example, according to some embodiments, application server 840 provides a comprehensive set of embedded services which provide end-to-end support for Web-based applications. The services may include a lightweight web server, configurable support for OData, server-side JavaScript execution and access to SQL and SQLScript.

Application server 840 may provide application services (e.g., via functional libraries) which applications 845 may use to manage and query the data of database 860. The application services can be used to expose the database data model, with its tables, hierarchies, views and database procedures, to clients. In addition to exposing the data model, application server 840 may host system services such as a search service.

Database 860 may store data used by at least one of: applications 845 and the payload generation module 808. For example, database 860 may store one or more tree structures accessed by the payload generation module 808 during execution thereof.

Database 860 may comprise any query-responsive data source or sources that are or become known, including but not limited to a structured-query language (SQL) relational database management system. Database 860 may comprise a relational database, a multi-dimensional database, an extensible Markup Language (XML) document, or any other data storage system storing structured and/or unstructured data. The data of database 860 may be distributed among several relational databases, dimensional databases, and/or other data sources. Embodiments are not limited to any number or types of data sources.

In some embodiments, the data of database 860 may comprise one or more of conventional tabular data, row-based data, column-based data, and object-based data. Moreover, the data may be indexed and/or selectively replicated in an index to allow fast searching and retrieval thereof. Database 860 may support multi-tenancy to separately support multiple unrelated clients by providing multiple logical database systems which are programmatically isolated from one another.

Database 860 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently used data) and one or more fixed disks (e.g., persistent memory for storing their respective portions of the full database).

Client 850 may comprise one or more individuals or devices executing program code of a software application for presenting and/or generating user interfaces to allow interaction with application server 840. Presentation of a user interface as described herein may comprise any degree or type of rendering, depending on the type of user interface code generated by application server 840.

For example, a client 850 may execute a Web Browser to request and receive a Web page (e.g., in HTML format) from a website application 845 of application server 840 to provide the UI 400 via HTTP, HTTPS, and/or Web Socket, and may render and present the Web page according to known protocols. The client 850 may also or alternatively present user interfaces by executing a standalone executable file (e.g., an .exe file) or code (e.g., a JAVA applet) within a virtual machine.

Figure 9:
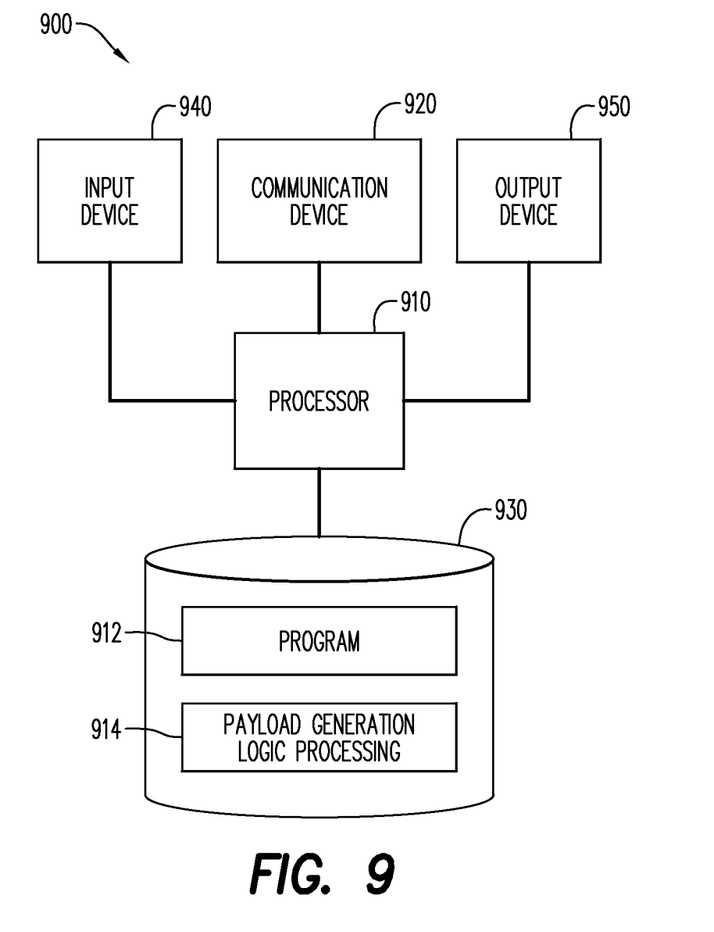
FIG. 9 is a block diagram of a system according to some embodiments.

FIG. 9 is a block diagram of apparatus 900 according to some embodiments. Apparatus 900 may comprise a general- or special-purpose computing apparatus and may execute program code to perform any of the functions described herein. Apparatus 900 may comprise an implementation of one or more elements of system 800. Apparatus 900 may include other unshown elements according to some embodiments.

Apparatus 900 includes payload generation processor 910 operatively coupled to communication device 920, data storage device 930, one or more input devices 940, one or more output devices 950 and memory 960. Communication device 920 may facilitate communication with external devices, such as application server 840. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to manipulate graphical user interfaces and to input information into apparatus 900. Output device(s) 950 may comprise, for example, a display (e.g., a display screen) a speaker, and/or a printer.

Data storage device/memory 930 may comprise any device, including combinations of magnetic storage devices (e.g., magnetic tape, hard disk drives and flash memory), optical storage devices, Read Only Memory (ROM) devices, Random Access Memory (RAM), cloud platforms (e.g., cloud object stores, cloud-based block storage devices) etc.

The storage device 930 stores a program 912 and/or payload generation platform logic 914 for controlling the processor 910. The processor 910 performs instructions of the programs 912, 914, and thereby operates in accordance with any of the embodiments described herein, including but not limited to process 100/500/700.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

The foregoing diagrams represent logical architectures for describing processes according to some embodiments, and actual implementations may include more, or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 800 may include a processor to execute program code such that the computing device operates as described herein.

All systems and processes discussed herein may be embodied in program code stored on one or more computer-readable non-transitory media. Such non-transitory media may include, for example, cloud computing, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
 a payload source;
 a memory storing processor-executable program code; and
 a processing unit to execute the processor-executable program code to cause the system to:
  receive a payload structure from the payload source, wherein the payload structure includes one or more fields without data values in the fields;
  traverse the payload structure;
  identify one or more key-value pairs via the traversal;
  identify, for each identified key-value pair, a first attribute for each key;
  create a node in a hierarchical tree structure for each key-value pair based on the identified first attribute and a value of the key-value pair, and wherein a first created node is a root node and subsequently created nodes are positioned in the hierarchical tree structure based on a node type, and wherein:
   in a case the identified first attribute for a given key is type and a value of the key-value pair is property, the created node is a parent node type, and
   in a case the identified first attribute for a given key is type and a value of the key-value pair is not property, the created node is a child node type;
  generate a data-entry field in a user interface for each created node;
  render the user interface, wherein the rendered user interface includes a label for each created node, and the label is linked to a respective data-entry field; and
  transmit a generated test payload to a target system as part of a test.

2. The system of claim 1, wherein the payload structure is received from the payload source in an HTML format.

3. The system of claim 2, wherein the HTML format is converted to a JSON format prior to traversal of the payload structure.

4. The system of claim 1, wherein the rendered user interface includes the created parent nodes and the created child nodes arranged in the hierarchical tree structure.

5. The system of claim 1, further comprising processor-executable program code to cause the system to:
 receive data in at least one data-entry field; and
 generate the test payload with the received data.

6. The system of claim 5, further comprising processor-executable program code to cause the system to:
 receive a node extension.

7. The system of claim 6, wherein receiving the node extension further comprises processor-executable code to cause the system to:
 receive selection of at least one data-entry field;
 receive an indication of a copy command, wherein the copy command copies a payload structure for the node;
 receive selection of a node, wherein the selection marks the node as extendable;
 receive an indication of a paste command; and
 extend the extendable node based on the paste command, wherein the paste command generates a second data-entry field linked to the label of the extendable node.

8. The system of claim 1, wherein the label for each created node includes a mandatory parameter indicator in a case the node is required for execution of the test payload.

9. A computer-implemented method comprising:
 receiving a payload structure from a payload source, wherein the payload structure includes one or more fields without data values in the fields;
 traversing the payload structure;
 identifying one or more key-value pairs via the traversal;
 identifying, for each identified key-value pair, a first attribute for each key;
 creating a node in a hierarchical tree structure for each key-value pair based on the identified first attribute and a value of the key-value pair, wherein:
  a first created node is a root node;
  subsequently created nodes are positioned in the hierarchical tree structure based on a node type;
  in a case the identified first attribute for a given key is type and a value of the key-value pair is property, the created node is a parent node type, and in a case the identified first attribute for a given key is type and a value of the key-value pair is not property, the created node is a child node type;

generating a data-entry field in a user interface for each created node;

rendering the user interface, wherein the rendered user interface includes a label for each created node, and the label is linked to a respective data-entry field; and transmitting a generated test payload to a target system as part of a test.

10. The computer-implemented method of claim 9, wherein the payload structure is received from the payload source as metadata.

11. The computer-implemented method of claim 10, further comprising:

converting the metadata to a JSON format prior to traversal of the payload structure.

12. The computer-implemented method of claim 9, wherein the child node has an attribute of type and the value of the key-value pair is array.

13. The computer-implemented method of claim 12, wherein the array is adapted to store one or more children of the child node, creating a nested structure.

14. The computer-implemented method of claim 9, further comprising:

determining, while traversing the payload structure, the payload structure for the child node includes an array;

traversing, via a recursive loop, all elements of the array;

passing each array element to a given function of the child node;

generating a hierarchical tree structure including nested arrays for parent-child relationships; and rendering the generated hierarchical tree structure on the user interface.

15. The computer-implemented method of claim 9, further comprising:

determining, while traversing the payload structure, an array is absent from the payload structure for the child node;

passing a structure of the traversed key for the child node to a function of the parent node;

generating a hierarchical tree structure having nested arrays for parent-child relationships; and rendering the generated hierarchical tree structure on the user interface.

16. The computer-implemented method of claim 9, wherein the rendered user interface includes the created parent and child nodes arranged in a hierarchical tree structure.

17. The computer-implemented method of claim 9, further comprising:

receiving data in at least one data-entry field; and generating the test payload with the received data.

18. A non-transitory, computer readable medium having executable instructions stored therein to perform a method, the method comprising:

receiving a payload structure from a payload source, wherein the payload structure includes one or more fields without data values in the fields;

traversing the payload structure;

identifying one or more key-value pairs via the traversal;

identifying, for each identified key-value pair, a first attribute for each key;

creating a node in a hierarchical tree structure for each key-value pair based on the identified first attribute and a value of the key-value pair, wherein:

a first created node is a root type;

subsequently created nodes are positioned in the hierarchical tree structure based on a node type;

in a case the identified first attribute for a given key is type and a value of the key-value pair is property, the created node is a parent node type, and in a case the identified first attribute for a given key is type and a value of the key-value pair is not property, the created node is a child node type;

generating a data-entry field in a user interface for each created node;

rendering the user interface, wherein the rendered user interface includes a label for each created node, and the label is linked to a respective data-entry field; and transmitting a generated test payload to a target system as part of a test.

* * * * *